United States Patent [19]

Pender

[11] Patent Number: 5,435,363
[45] Date of Patent: Jul. 25, 1995

[54] RUN-FLAT PNEUMATIC TIRES INCLUDING PLURAL SEPARATE INSERTS

[76] Inventor: David R. Pender, 1018 Marion St., Columbia, S.C. 29201

[21] Appl. No.: 20,150

[22] Filed: Feb. 19, 1993

[51] Int. Cl.$^6$ .............................................. B60C 17/06
[52] U.S. Cl. ..................................... 152/158; 152/520
[58] Field of Search ......................... 152/158, 520, 516

[56] References Cited

U.S. PATENT DOCUMENTS

| | | |
|---|---|---|
| 2,067,545 | 1/1937 | Ricketts, Jr. . |
| 3,682,218 | 8/1972 | Johannsen et al. . |
| 4,046,182 | 9/1977 | Farnsworth . |
| 4,157,106 | 6/1979 | Cataldo . |
| 4,157,107 | 6/1979 | Cataldo . |
| 4,223,713 | 9/1980 | Ewing . |
| 4,281,701 | 8/1981 | Ross ..................................... 152/158 |
| 4,773,461 | 9/1988 | Landers et al. ..................... 152/520 |
| 4,901,779 | 2/1990 | Holzer . |
| 5,115,852 | 5/1992 | De Lorean . |
| 5,341,861 | 8/1994 | Forte ................................... 152/158 |

FOREIGN PATENT DOCUMENTS

| | | |
|---|---|---|
| 1022483 | 1/1958 | Germany . |
| 2309814 | 9/1974 | Germany . |
| 7706663 | 12/1978 | Netherlands . |
| 1305383 | 1/1973 | United Kingdom . |

*Primary Examiner*—Geoffrey L. Knable

[57] ABSTRACT

A run-flat tire that consists of about eight to twelve free-standing, separate and independent inserts, bonded to the inside of a conventional tubeless tire (30) that is mounted on a conventional one piece drop center wheel (31). The accompanying drawing shows a cross section view of one of these inserts in the tire. Each insert consists of a pair of rigid, load supporting, spread-apart legs (33); a rubber rim pad (34); a pair of rubber foot pads (35) which are bonded to the inside of opposite tire bead flanges.

The rubber rim paid is bonded to the top of the leg pair to permit the legs to swing in and out, which is necessary during mounting and demounting the tire from the wheel. The pair of rubber foot pads are made to permit each leg pair to swing back and forth, independently, as needed, under run-flat driving. This tilting of the inserts automatically compensates for the difference between the rolling circumference of the set of inserts and the rolling circumference of the tire. This sequential tilting action of each insert eliminates sliding friction at the point of contact between the rim pad and the inside of the tire tread. Under run-flat driving, the spread apart leg pair push the pair of tire bead flanges outward against the wheel rim flanges to help keep the tire bead flanges on the wheel rim.

10 Claims, 8 Drawing Sheets

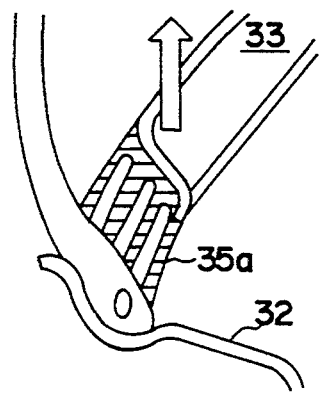 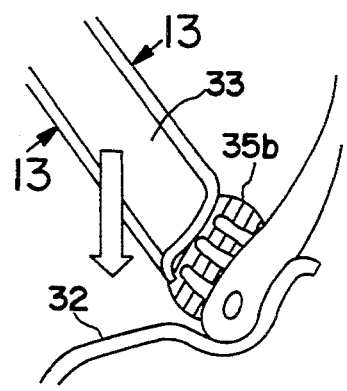
FIG.12a    FIG.12b
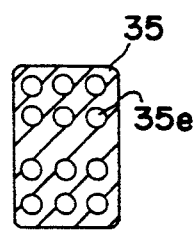 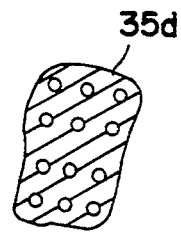 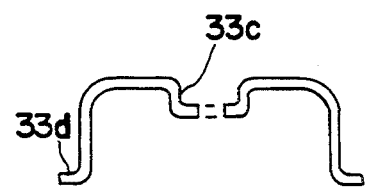
FIG.10    FIG.11    FIG.13
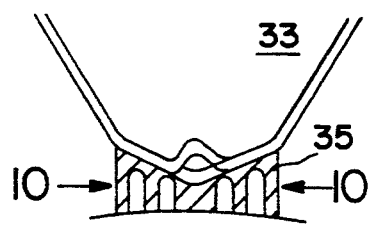 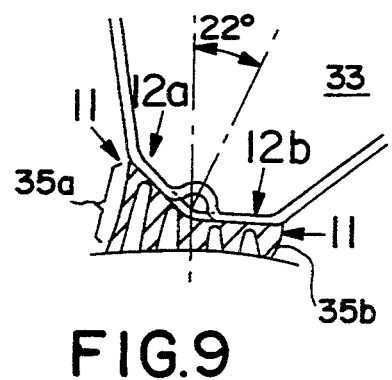
FIG.8    FIG.9

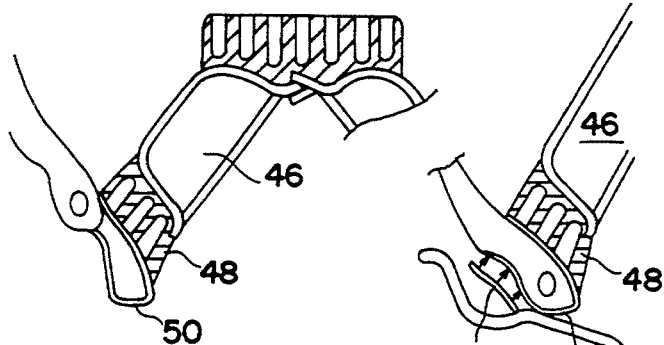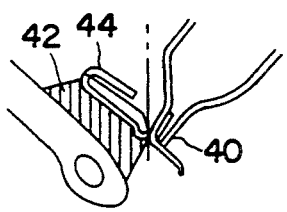
FIG.15a  FIG.15b  FIG.14a
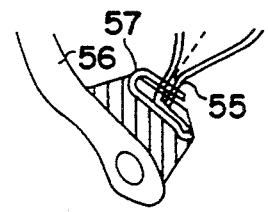
FIG.14b
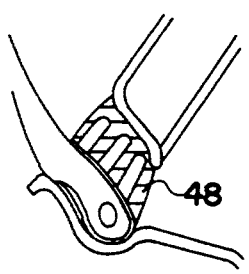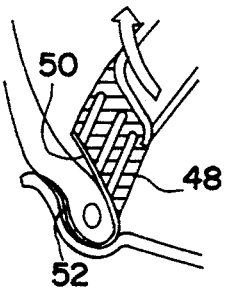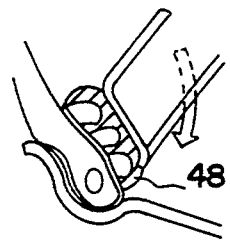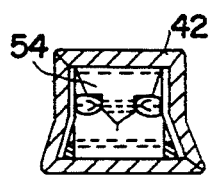
FIG.15c  FIG.15d  FIG.15e  FIG.14c
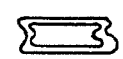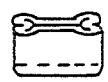
FIG.14d  FIG.14e  FIG.14f
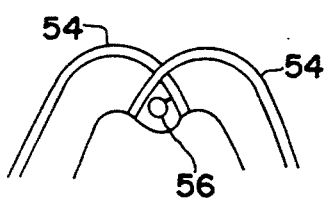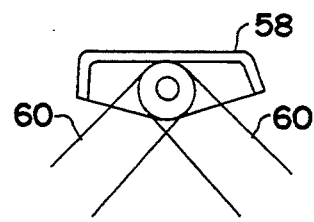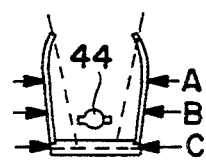
FIG.16  FIG.17  FIG.14g

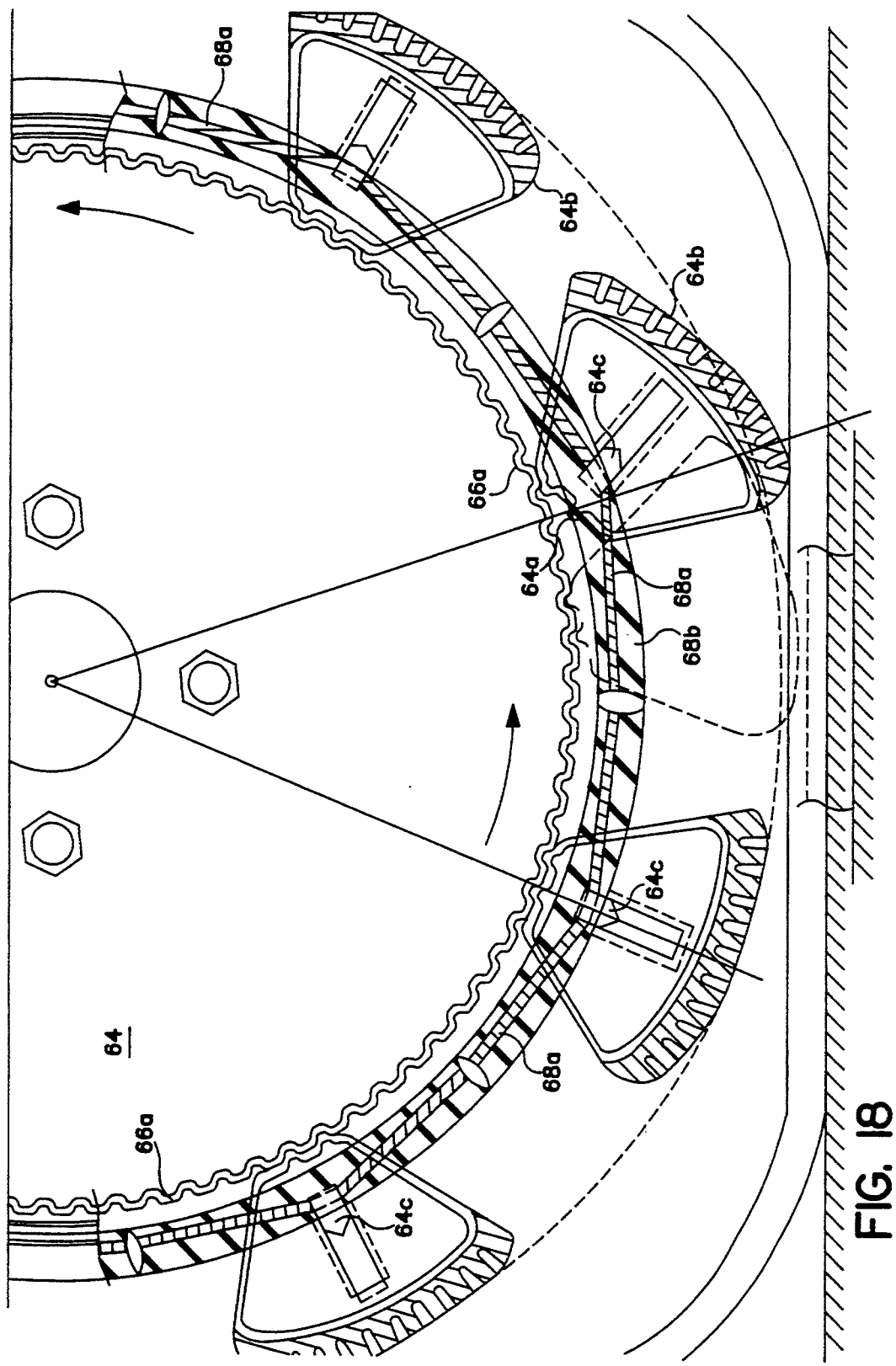

RUN-FLAT PNEUMATIC TIRES INCLUDING PLURAL SEPARATE INSERTS

BACKGROUND OF INVENTION

1. Field of Invention

This invention relates to "run-flat" tubeless, pneumatic tires that require internal support to provide the run-flat capability.

There are two other relevant competitive categories of run-flat tires that include: (1) those that require no internal support, and depend on extra thick side walls for run-flat capability; and (2) those that require no rigid internal support and use separate inner and outer concentric air chambers so that the inner chamber will support the load when the outer chamber loses pressure.

2. Prior Art

After almost 100 years of pneumatic tire use, there has been no widespread commercial use of any type of run-flat tires. However, there have been some attempts. The Dunlop Tire Co. attempted to market a run-flat tire using internal support in the mid-1970's. It required a special multi-piece wheel, and the use of an automatic releasable lubricant. It did not succeed. Dunlop had to set up special facilities for tire repair throughout the United Kingdom. The extra time, inconvenience and cost for repair was probably a major factor in its failure (*Rubber Age,* page 70, Sep. 1973; Rubber World, page 44, Apr. 1976).

There is, however, a run-flat tire in production for the military. The U.S. Army uses a run-flat tire with internal support on most of its wheeled vehicles (*Automotive Engineering,* Aug. 1986, page 25). According to the Army Technical Manual, these vehicles, in run-flat operation are limited to 30 m.p.h. for 30 miles, and it takes 2.2 hours to repair the tire. The long repair time appears due to the fact that it requires a special multi-piece wheel that must be bolted together, and also requires the use of a container of releasable lubricant/coolant that must be cleaned out and replaced when the tire is repaired. The Army tolerates the repair difficulties by carrying a spare tire or by driving to the motor pool and dropping off the flat, and replacing it with another premounted, run-flat tire. This practice could not work for the civilian market.

There is a beginning of commercial activity in run-flat tires without internal support that use extra thick sidewalls for support. In the fall of 1992, Bridgestone was working on run-flat tires specifically for the Corvette. Goodyear is planning a run-flat tire for 1993. Both require the use of electronic sensors to detect low pressure.

Those extra thick sidewalls, which carry the weight in run-flat operation, also carry the penalty of greater rolling resistance in normal highway driving. If there is even a minor loss of tire pressure, rolling resistance and heat buildup escalate rapidly. That is why these tires come equipped with expensive electronic low pressure warning devices. This higher rolling resistance adversely affects tire life and gas mileage, and is not an insignificant drawback to this type of run-flat. This extra thick sidewall type of run-flat appears to be limited to relatively low aspect ratio tires that are generally used in high performance sports cars.

Run-flat tires with separate air chambers have been on and off the market since the 1930's. Presently, Goodyear makes this type of run-flat tire for professional race cars. The problem with this type of run-flat is that the cause of the flat, such as a nail puncture or other road hazard, may also puncture the internal reserve air chamber and therefore reduce its reliability.

Since my run-flat tire requires the use of internal support, my prior art patent search is mostly limited to that category (Class 152/520 and 152/158). I found over 100 patents in this sub-class issued over the last 45 years. The earliest patent I found on run-flat tires using internal support in pneumatic tires was in 1937 (U.S. Pat. No. 2,067,545). It had a metal annular internal support rim integrated with the inner tube. (This was before the use of tubeless tires). This internal support was a separate unit from either the tire or the wheel and it required the use of a special multi-piece wheel.

In general, run-flat tire patents with internal support differ from each other in the manner that they solve problems that are common to all such run-flat tires. Below I am listing five features of my invention that deal with the various problems of run-flat tires. For each of these five features I found between five and ten patents with at least one of these features. Several patents had two or three of these features. None of these patents had more than three of these features. Also, the features in these patents took a different form and served a different purpose than the same features in my invention.

For each of these features, I have listed one patent that most closely relates to my invention, along with appropriate comments. The features are as follows:

Feature #1

Run-flat tires with internal support that use a standard one piece drop center wheel, with all the run-flat capability built directly into the tire. Example: Patent #1,022,483; Federal Republic of Germany, Jan. 1958. This particular feature helps make tire changing quicker and easier, as compared with run-flat tires that have run-flat capability built into the wheel. Also, being able to use standard wheels make run-flat tire sales feasible for the replacement tire market. The structure of the internal support in all of the patents with this feature were totally different from the structure of the internal support of my invention.

Feature #2

The internal support unit, when in run-flat operation, is designed to push outward against the wheel-rim flanges, which in turn pushes outward against the tire bead flanges. Example: Patent #1,305,383, United Kingdom, Jan. 1973. This feature aids in keeping the tire on the wheel in run-flat operation. This particular feature contributes to the feasibility of using the conventional one piece, drop center wheel as in Feature #1. The structure of my internal support with this feature was totally different from all the other patents that I saw with this feature.

Feature #3

The internal support consists of a multiple number of separate segments instead of an annular internal rim. Example: Patent #2,309,814, Federal Republic of Germany, Sep. 1974. I could not figure out the purpose of the intermittent support for some of these patents. In the example above, the purpose appears to provide an easy way to insert the inserts in the tire after the tire has been mounted on the wheel. In my invention this feature is a critical component in the method I use to eliminate internal sliding friction in run-flat operation. The structure of these separate inserts was different from those in my invention. None appeared to be used to solve the internal friction problem, as does my invention.

Feature #4

The internal support has shock absorbing capability. Example: Patent #2,309.814, Fed. Rep. of Germany, Sep. 1974. This feature is found in many run-flat tires with internal support. It is often found as a by-product from other features as in the patent example in Feature #1, and the patent example in Feature #2. This feature was deliberately added in the patent example in Feature #3. In my invention, this feature was also a by-product of other features. This is an important feature because it makes run-flat driving more comfortable, and reduces the chance of damage to the tire, inserts, axles and suspension components, during run-flat operation.

Feature #5

The internal support unit eliminates sliding friction without the use of a lubricant/coolant.

Most of the prior art of all run-flat tires with internal support rely on the use of a releasable lubricant/coolant to reduce this internal support friction problem. In many of these patents, this problem is not referred to, nor is a solution suggested, but the problem clearly exists. The patent office has a separate sub-class on releasable lubricant concerning chemical composition, containers, and method of release of the lubricant.

Almost all of the prior art patents that do not require the use of an internal lubricant use some type of roller or ball bearing integrated in the internal support unit to eliminate sliding friction. Example: U.S. Pat. No. 4,901,779, Feb. 6, 1990. Those patents did not relate in any way to my method of eliminating sliding friction.

There was one patent that used a method of eliminating sliding friction that was similar in concept to my invention. This was: U.S. Pat. No. 3,682,218, Aug. 1972. This patent and this feature merit more detailed explanation than the previous four features. This patent is also the most important prior art relating to my invention.

This U.S. patent invention consists of a metal, annular internal support rim attached to a special multi-piece wheel. A thick rubber tread is bonded to the metal rim surface of this internal rim. There are wide transverse gaps cut into this annular rubber tread which create a number of separate elastic rubber blocks. Under run-flat loading, these elastic rubber blocks are deformed by a combination of shear-compression loading that increases the distance between adjacent rubber blocks under load. This results in an increase in distance between adjacent blocks under load which automatically adjust for the difference in rolling circumference of the internal rim support and the rolling circumference of the tire. This action prevents sliding friction between the internal support rim and the inside of the tire tread.

The detailed description of my invention should make it clear the similarities and the differences between my invention and this prior art.

OBJECTS AND ADVANTAGES

1. It is the object of this invention to create a run-flat tire with internal support that is fully integrated with the tire in a single, unified piece that is mated with a standard, one piece, drop center wheel.

2. It is the further object of this invention to produce a tire that, when running in the pressureless, run-flat mode, will ride less flat than any other run-flat tire, with less internal friction and less heat buildup and better control. As a result, it can travel farther and faster with less tire damage than any other run-flat tire with or without internal support and can do this without the use of a releasable lubricant/coolant.

3. It is the further object of this invention that this run-flat tire be as easily and as quickly repaired as standard non-run-flat tires using the same tire changing equipment and labor skills as for non-run-flat tires. (This object is in part a function of Object #1 and Object #2 above.)

4. It is the further object of this invention that the production cost of this run-flat tire be no more than 50% of the cost of the same tire without run-flat capability. For new cars sold with this run-flat tire, there should be no significant cost increase, after subtracting the cost of a standard size spare tire, wheel, jack and lug wrench which will no longer be needed.

5. It is the further object of this invention that the run-flat capability should not add more than 30% to the tire weight. This means that after subtracting the weight of a standard size spare tire, wheel, jack and lug wrench, there should be a small reduction in vehicle weight.

6. It is the further object of this invention to create a run-flat tire that, when the tread is worn out, the tire carcass would be too valuable to throw away, and would be recapped as a matter of course, as are most truck tire carcasses. Considering the present long life of premium radial tires (60,000 to 80,000 miles); one recap could extend the run-flat tire life to equal car life for many car owners.

7. It is the further object of this invention to create a run-flat tire that will have easy access to the replacement tire market which makes up 70% of the tire market. This is primarily a function of being able to use conventional one piece drop center wheels (Object #1) and provide easy tire repairs (Object #3).

8. It is the further object of this invention to create an internal support run-flat tire that, when driven at normal inflated pressure will provide driving performance and tire life that would be nearly identical to a like-quality tire without run-flat capability. The feature that makes this possible is that the cross-section of the flexing part of the tire (which is all but the tire bead area) is identical to the cross-section of the same tire without run-flat capability.

9. It is the further object of this invention to provide a method for inserting and bonding a set of inserts inside a tubeless, pneumatic tire for large scale production.

SUMMARY OF THE INVENTION

The run-flat capability is built entirely in the tire and is used in combination with a conventional one piece drop center wheel. The internal support unit consists of a multiple number of separate and independent, free standing inserts, equally spaced in a circle inside the tire. The number of inserts would be a minimum of about eight and a maximum of about 15, depending on tire dimensions and other factors.

Each insert consists of a pair of substantially rigid legs, preferably of a high strength, light weight metal. The top ends of the leg pair are joined and held relatively close together by an elastic rubber pad and is called a rim pad. The bottom ends of the leg pair are spread apart, and have an elastic rubber pad bonded to the base of each leg, and is called a foot pad. Each insert is anchored to the tire by a pair of rubber foot pads which are bonded to the inside of the tire across opposite tire bead flanges. The spread apart legs form a triangular stabilizing load supporting structure, with the rim pad extending up inside the tire.

In run-flat driving, vehicle weight on the rim pads push the leg pair outward against the tire bead flanges, which in turn push outward against the wheel rim flanges to aid in keeping the tire on the wheel in the absence of air pressure.

The top of each leg pair is bonded to the rubber rim pad in such a way that allows the leg pair of each insert to swing in and out independently, when necessary. This is necessary when mounting and demounting the tire on the wheel.

The bottom pair of rubber foot pads at the base of each insert are made so that they hold each insert in the upright position in normal driving. But in "run-flat" driving, the rubber foot pads permit each insert to deflect, fore and aft, under load as needed, and spring back to the upright position when the load is removed. This deflection permits each insert under load to tilt sequentially and thereby increase the distance between adjacent insert rim pads as the wheel turns. During one wheel revolution, the sum of the radial tilt distance of all the insert rim pads would equal the difference between the rolling circumference of the tire and the rolling circumference of the internal support unit. This invention eliminates the sliding friction that normally occurs on those systems that use an internal support annular rim which would require a releasable lubricant inside the tire.

DESCRIPTION OF DRAWINGS

FIG. 4a shows one set of insert legs spread wide apart and FIG. 4b shows the opposite set of legs squeezed together.

FIG. 8 is a side-section view of a foot pad bonded to the bottom of a leg, in the neutral or upright position.

FIG. 9 is the same as FIG. 8 except the insert is in the maximum tilt or deflected position.

FIG. 10 is a top section view (Section E) through the foot pad of FIG. 8 in the neutral position.

FIG. 11 is a top section view (Section D) through the foot pad of FIG. 9 in the maximum tilt position.

FIG. 12a is a cross section view of the tension side (Section B) of FIG. 9.

FIG. 12b is a cross section view through the compression side (Section C) of FIG. 9.

FIG. 13 is a cross section view (Section A) through a section of one leg of FIG. 12b.

FIGS. 14 to 20 are drawings of alternate embodiments.

FIGS. 14a to 14g show a detachable insert with a mechanical fastener between the leg base and foot pad that is bonded to the inside of the tire bead flanges.

FIGS. 15a to 15e show a detachable insert that clips on to an unmodified tubeless, pneumatic tire.

FIGS. 16 and 17 show two alternate versions of rim pads for the inserts.

FIGS. 18 to 20 show another method for attaching a set of inserts to the inside of the pair of tire bead flanges.

Figure 1:
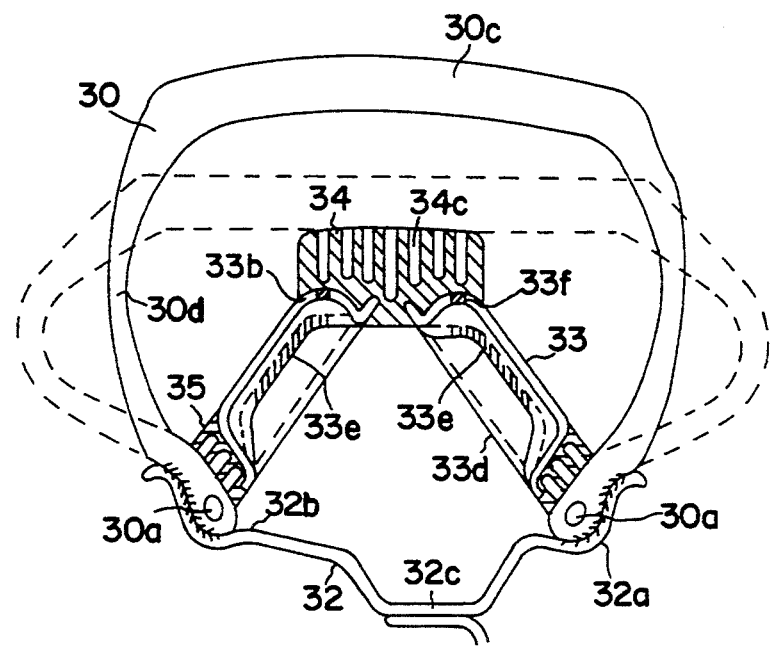
FIG. 1 is a cross-section view of one of nine inserts that is bonded to the tire and mounted on the wheel.

| LIST OF REFERENCE NUMERALS FOR PREFERRED EMBODIMENTS |
| --- |
| 30 tubeless tire |
| (a) tire bead; (b) tire bead flange; (c) tread; (d) side wall |
| 32 one piece drop center wheel |
| (a) wheel rim flange; (b) safety ridge; (c) wheel well |
| 33 free standing load support insert |
| (a) leg base; (b) leg top; (c) reinforcing rib; (d) leg flange; (e) slot for pull latch; (f) slot for positioning push stop |
| 34 insert rubber rim pad |
| (a) lead pad; (b) trailing pad; (c) pad holes |
| 35 insert rubber foot pad |
| (a) stretch side; (b) compression side; (c) bottom of pad (d) top of pad (e) pad holes |
| 36 modified mount-demount head of rim clamp tire changer |
| 38 represents contact adhesive line |
| (a) on tire bead flange (b) on wheel rim flange |
| Reference Numerals for Alternate Embodiments |
| Alternate #1 |
| 40 leg base mechanical latch |
| 42 rubber foot pad |
| 44 latch receiver (bonded to foot pad) |
| Alternate #2 |
| 46 alternate leg |
| 48 alternate foot pad |
| 50 thin steel spring clip |
| 52 rubber adhesive tape sealant |
| Alternate #3 |
| 54 modified leg top to rim pad |
| 56 hinge bolt |
| Alternate #4 |
| 58 separate metal rim pad |
| 60 leg top for separate metal rim pad |
| 62 hinge bolt to join leg pair with rim pad |
| Alternate #5 |
| 64 modified inserts |
| (a) leg base gear teeth; (b) rim pad; (c) spike hook anchor |
| 66 modified wheel |
| (a) wheel rim gear teeth |
| 68 cable-rubber in shear Spring anchor |
| (a) steel cable (b) rubber in shear bond. |

DETAILED DESCRIPTION OF THE PREFERRED EMBODIMENT

A. STATIC DESCRIPTION

Figure 5:
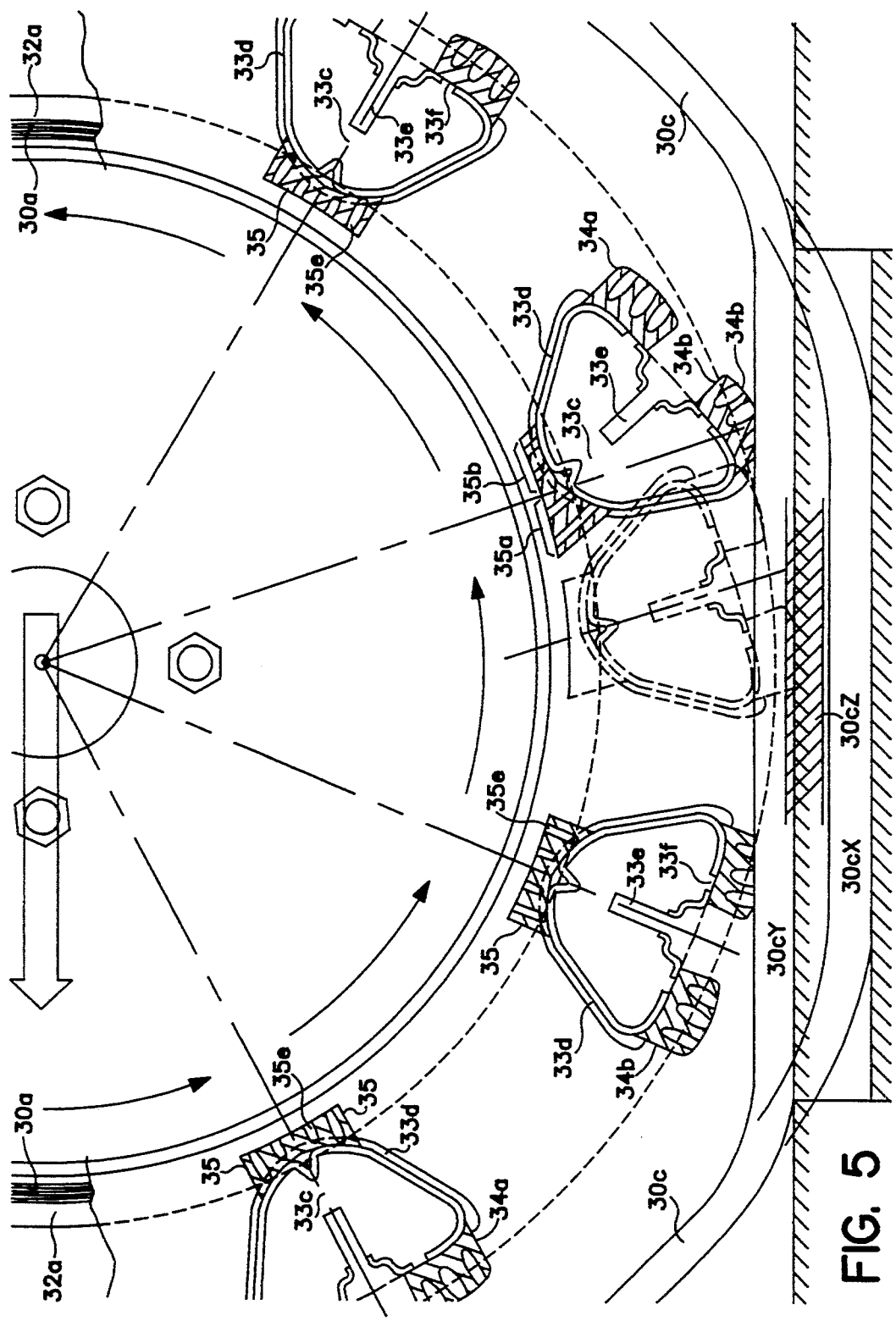
FIG. 5 shows a partial side view of a wheel-tire combination, with inserts installed, showing the dynamics of the action of the inserts, as the wheel rotates, during run-flat operation.
Figure 7:
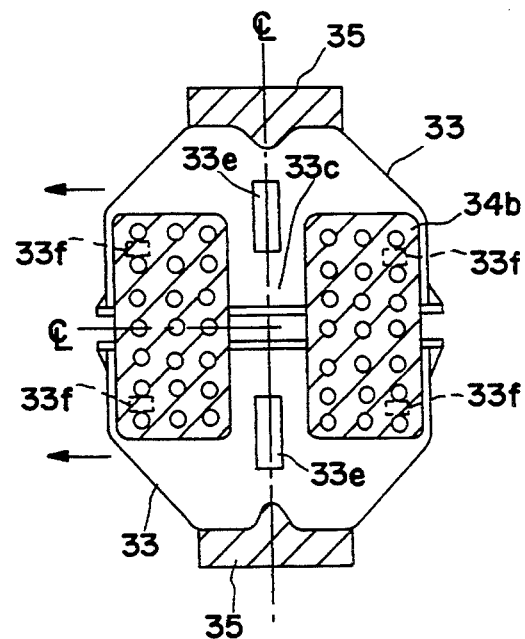
FIG. 7 is the top view of one insert.

This invention consists of a multiple number of separate, independent, free standing, load supporting inserts bonded to the inside of a tubeless pneumatic tire. FIG. 1 shows a section view of one of the inserts bonded across opposed pair of tire bead flanges, with the tire mounted on a conventional one piece, drop center wheel. FIG. 5 is a side view showing how a multiple number of the inserts are equally spaced, in a circle, inside a tire that is mounted on a wheel. In this drawing there are nine inserts per tire. The number of inserts could vary from about 8 to 15, depending on the dimensions of the tire and other factors. FIG. 7 shows a top view of one of the inserts.

FIGS. 1, 5, and 7 show that each insert consists of: a pair of rigid load supporting legs 33, a rubber rim pad 34, and a pair of rubber foot pads 35. The upper ends of the leg pair are close together and bonded to the rim pad 34; and the bottom ends of the leg pair are spread apart and bonded to the foot pads 35, which are bonded to the inside of the tire bead flanges 30b.

Figure 2:
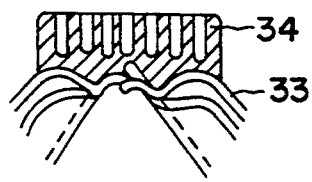
FIG. 2 shows a modified top of the leg pair at the point where the legs swing in and out.
Figure 3:
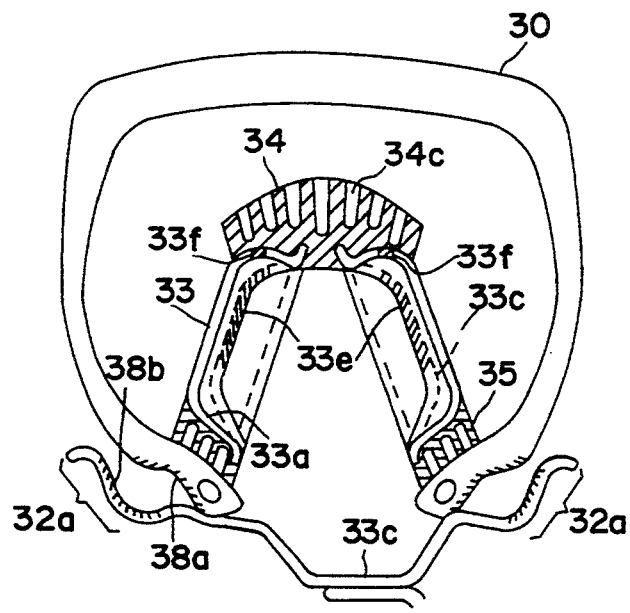
FIG. 3 shows a cross-section of the run-flat tire being mounted on the wheel with insert legs close together just prior to inflation to force tire beads over the safety ridges.

The rim pad 34 is joined to the upper ends of the leg pair in such a way that permits the opposed legs to swing in and out. In this preferred embodiment, the opposed legs do not actually touch. There is a small gap between the legs as shown in FIG. 1. FIG. 2 shows an alternate method where the legs touch and mesh in such a way as to prevent any relative up and down movement between opposed legs.

The foot pads 35 are bonded to the inside of the tire bead flanges 30b as a flexible connection that will hold the inserts in the upright position, but will permit the inserts, when under load, to tilt forward or backward. In this preferred embodiment, each foot pad is of a shallow "V" shape when viewed from the side, as shown in FIG. 5 and FIG. 8.

Each insert is one piece, and when all the inserts are bonded to the tire, the run-flat tire is still one piece. There are no fasteners or added parts in the tire-wheel assembly.

The left and right legs are identical, and they would logically be made from a high strength ductile metal such as aluminum alloy or steel. This leg is the only metal manufactured component of this invention. In a product of this type, the cost, weight and adaptability to large scale mass production is very important. To meet this criterion, I have chosen a shallow drawn presswork process where the workpiece is held around the flanged edges by a pressure plate, and stretched to conform to the shape of mating male and female dies to produce the proper shape. This part is sometimes referred to as "hat" shaped in the pressed-metal trade. Those skilled in the art of metal forming would have no trouble making this part. This leg flange (33d of FIG. 1 and FIG. 5) that is held down by the pressure plate is also used to increase the strength of the insert. Additional strength is pressed into the leg by a reinforcing rib 33c in the center of the leg that runs the length of the leg.

In the trough of this reinforcing rib, I show a cut-out slot 33e in FIGS. 5 and 7. Also, along the sides, near the top of the leg is another pair of smaller slots 33f in FIG. 7. These two sets of cut-out slots are part of a method I used for inserting and positioning the inserts to the inside of the tire bead flanges. More on this later.

Note that the rubber rim pad 34 in FIGS. 5 and 7 is in fact two separate pads (34a and 34b of FIG. 5). There are two reasons for leaving a gap to separate the rim pad: (a) the center part of the pad is not needed, and to leave that space open reduces material cost and weight of the insert; (b) rim pad in that center of the leg-pair would interfere with the center reinforcing rib and also interfere with an inserter latch used in the inserting process that would pass through the slot for the pull latch 33e as shown in FIGS. 1, 5 and 7.

Note that holes are made in both the rubber-like rim pad 34 and the rubber-like foot pads 35. The number and size of these holes can be made to regulate deflection under load and would also reduce weight of inserts.

B. OPERATIONAL DESCRIPTION

1. The Internal Friction-Problem and Solution

In normal driving, an inflated pneumatic tire supports vehicle weight and also transmits torque. If the wheel makes one revolution, the vehicle moves forward the rolling circumference of the tire. In run-flat driving, the internal support unit, which are the inserts, falls down on the inside of the tire tread and supports the vehicle weight by using the inside of the tire tread as a "highway" or support surface. However, torque is still transmitted by the tire. Let's say the rolling circumference of the tire is 72 inches and the rolling circumference of the internal support unit is 60 inches. In normal driving one wheel revolution would move the vehicle forward 72 inches. But in run-flat driving with the vehicle weight on the internal supports, one wheel revolution will "try" to move the vehicle forward 60 inches. So, unless the tire bead flange breaks loose from the wheel rim flange due to torsional force, the vehicle will move forward 72 inches and the internal support will slip relative to the inside of the tire tread 12 inches per wheel revolution. This is due to the circumferential difference between the tire and the insert ($72\Delta - 60\Delta = 12\Delta$).

This causes high friction, heat buildup and limits speed and distance traveled in the run-flat mode. It is this problem that the released lubricant/coolant is supposed to solve, and which is used in most run-flat tires with internal support.

FIG. 5 illustrates how this invention solves the internal friction problem during run-flat operation. FIG. 5 is a side section view of the run-flat tire being supported by separate, free standing inserts as the tire rotates. The vehicle is supported by one insert at a time except when the load is being transferred from one insert to the adjacent insert. As the leading rim pad 34a on the leading insert rotates and comes in contact with the inside of the tire tread to support the vehicle, the trailing rim pad 34b on the adjacent insert is relieved of the load and snaps back to the upright position.

The tire tread is moving at a higher rotational speed than the internal support rim pads due to the circumferential difference between the tire tread and the rim pads. On contact between the rim pad and the inside of the tire tread, the rim pad is forced to increase speed and to move at the same speed as the tire tread. This is possible because the foot pads are designed to permit the inserts to tilt under load. Since the tire tread is moving faster than the rim pad, the insert will tilt rearward as the vehicle moves forward. That is, the two adjacent inserts under load will move apart. How far they move apart is a function of: (a) the number of inserts in the tire; and (b) the difference in circumference between the set of inserts and the tire. If there are nine inserts per tire, as shown, and if the relative circumference were as stated above: 72 inches for the tire and 60 inches for the insert set, then each insert will tilt enough to increase the distance between adjacent inserts by 1.33 inches ($72\Delta$ minus $60\Delta$ divided by 9).

FIG. 8 shows a side section view of the foot pad in neutral. FIG. 9 shows a side section view of the same foot pad in the full tilt position. FIGS. 12a and 12b show a cross-section of the foot pad under maximum tilt. FIG. 12a shows cross-section B of FIG. 9 (the stretch or tension side) and FIG. 12b shows cross-section C of FIG. 9 (the compression side). The size, spacing, and number of holes in the foot pad help to optimize the foot pads for deflection, loading and stress control. FIG. 10 shows the cross section E of the foot pad of FIG. 8. FIG. 11 shows cross section D near the top of foot pad of FIG. 9. Observe from FIG. 11 that there is also a twisting force of the foot pads during the tilting process. This is due to the angle that the foot pad is bonded to the tire bead flanges relative to the tilt motion of the inserts. This twisting or shear on the foot pads contributes to the stress on the foot pads.

FIG. 5 shows how, under maximum tilt, one side of the foot pad is compressed, and the other side stretched. The greater the tilt, the greater the stress on the foot pads, and the system must be designed so that certain limits are not exceeded. As mentioned, this is a function of the number of inserts and the circumferential difference between the set of inserts and the tire.

The foot pads will be the most highly stressed component of this run-flat system. There are inherent limits on length, width and depth of foot pads. The foot pads will be the limiting factor on the length of time the tire can be driven in the run-flat mode. The composition of the elastomeric material, the strength and fatigue resistance of the rubber to metal bond and the rubber to rubber bond of the foot pads to the tire bead flanges, are critical to the success of this invention.

2. Keeping the Tire on the Wheel in Run-Flat Operation

In run-flat driving, lateral forces against the tire such as sharp turns tend to unseat the tire bead flange from the wheel rim flange. Quick acceleration or braking tends to cause radial slippage between the tire bead flange and the wheel rim flange.

A look at the dashed line of FIG. 1 shows that when the tire loses air pressure and the insert supports the vehicle weight, the spread-apart leg pair push the tire bead flanges outward against the wheel rim flanges which tend to hold the tire bead flanges firmly against the wheel rim flange.

Note that this insert push-out force only occurs where the tire tread meets the road, and where the inserts are under vehicle load. On sharp turns the push-out force of the insert that holds the tire in place is at the same location of the force to dislodge the tire from the wheel rim. This same push-out force by the inserts also offers some resistance to the radial or torsional slippage between the tire and the rim that occurs during braking or acceleration. But the resistance to the radial slippage is primarily where the tire meets the road, while the radial slippage force is the full 360 degrees of the tire bead flange against the wheel rim flange.

I have devised a simple method to augment this resistance to radial slippage. It consists of placing an appropriate adhesive between the tire bead flange and the wheel rim flange. Details of this bonding are discussed in the next section on "Changing and Repair of this Run-Flat Tire."

It should be noted that the push-out force of the inserts plus the holding power of the adhesive between the tire bead flange and the wheel rim flange will not provide as strong a bond between the tire and wheel as the air pressure of an inflated tire. Therefore, during run-flat driving, the driver should avoid quick starts and rapid acceleration and also sudden stops and sharp turns.

3. Changing and Repair of this Run-Flat Tire

A fatal flaw in most run-flat tires with internal support are problems relating to changing and repairing the tire. Most require special skills, or special equipment, take a long time, and are costly to repair. I discussed this in the section on prior art. My run-flat tire will be easy to repair, by the same people now repairing regular tires, using the same tire changing equipment at about the same cost and time.

The reasons it is easy to repair are that (a) the run flat capability is built entirely in the tire and is not a separate unit and requires no assembly or disassembly; (b) it uses the standard one piece, drop center wheel, and (c) it doesn't need any releasable lubricant that has to be cleaned out and replaced as required in most other run-flat tires.

Figure 4A:
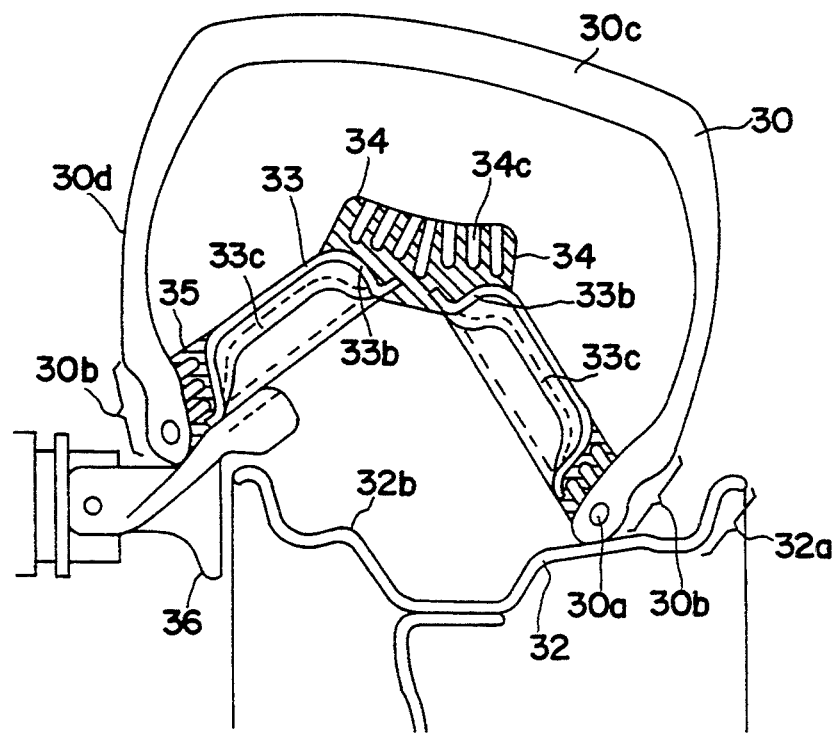
FIGS. 4a and 4b show opposite cross-sections of the run-flat tire and wheel being mounted (or demounted depending on the rotation of the wheel) showing a modified Mount-Demount Head of a Rim Clamp Tire changer.
Figure 4B:
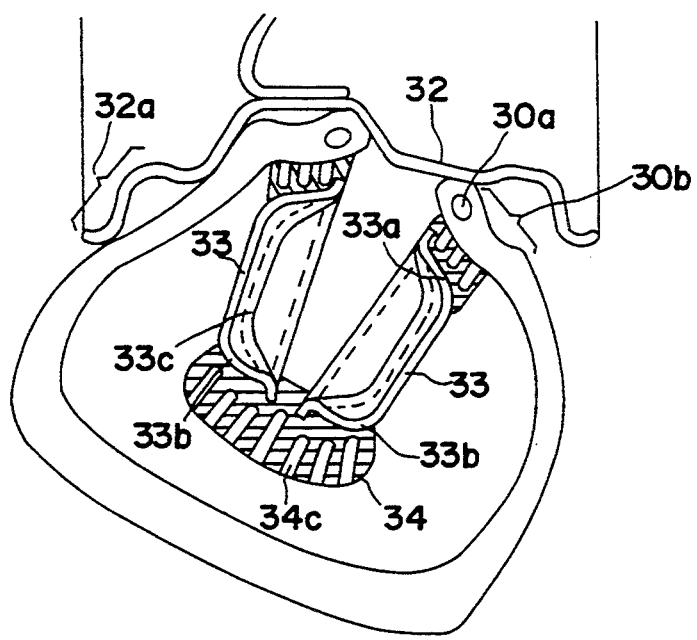

FIGS. 4a and 4b show a section view of opposite sides of my run-flat tire as it would look during mounting or demounting by a Rim Clamp Tire Changer. In FIG. 4a, one tire bead flange is already inside the wheel rim. The other tire bead flange is in the process of being mounted or demounted, depending on the direction the wheel is turning. FIG. 4b shows the opposed pair of tire beads being squeezed together, while the tire section on the other side of the tire, as shown in FIG. 4b, shows the opposed tire bead being pulled apart. FIGS. 4a and 4b illustrate how the top of the legs 33b is bonded to the Rim Pad 34 to allow the legs to swing in and out independently with the bottom of the leg pair bonded to the inside of opposite tire bead flanges via rubber foot pads. This run-flat tire has about the same flexibility and malleability as a conventional pneumatic tire without run-flat capability. When the run-flat tire is combined with the conventional one piece drop center wheel, a conventional Tire Changer can mount or demount the tire as it does with conventional tires.

A note of exception: For some type of tire changers, the mount-demount head may require some modification for some tires to prevent the head from getting hung up around the leg base foot pads 35. Because the foot pads are intermittent inside the tire, some lead-in contours of the Mount-Demount Head may need modification.

The aforementioned adhesive that is applied to the tire bead flange is used to augment the resistance to radial slippage and must be applied during the tire change procedure. However, this conflicts with another procedure during the tire change. It is standard practice to apply a rubber lubricant to the tire beads just before mounting the tire on the wheel to make it easier to get the tire bead flange to slide over the wheel rim flange without tire bead damage. However, this lubricant may prevent bonding of the adhesive between the tire bead flange and the wheel rim flange.

One approach to this problem is to use a formulation that serves as both a rubber lubricant and adhesive. The natural slipperiness of a wet contact rubber cement would allow it to function as a lubricant to aid in getting the tire bead over the rim. When the solvent evaporates, it serves as an adhesive. The adhesive can be applied to both the tire bead flange and wheel rim flange and allow to partially dry before contact of the two surfaces as the tire is inflated.

A formulation of rubber contact cement should provide the necessary high shear strength and low peel strength. Low peel strength is necessary so that the bead loosener shoe of a standard tire bead changer can easily break the contact rubber cement bond in subsequent tire changes. Old cement can be scraped off with a suitable wire brush and the new lubricant/adhesive applied. Other lubricant/adhesives can be formulated.

4. Driving Performance in Run-Flat Operation

Run-flat riding quality for this run-flat tire is a function of:
 (a) The number of inserts
 (b) Shock absorption of each insert
 (c) The distance adjacent pairs of inserts under load move apart (which is a function of number of inserts divided by circumferenced difference between the set of inserts and the tire)
 (d) The radial width of each rim pad
 (e) The speed of travel
 (f) The interaction of the existing springs and shock absorbers of the vehicle suspension system with the run-flat tire.

Run-flat tires that have a single, rigid annular rim for internal support give a smooth but hard ride in run-flat operation. However, that type of run-flat tire requires lubricant/coolant. While this lubricant/coolant reduces the radial sliding friction between the annular rim and the inside of the tire tread, it often permits lateral slippage between the internal rim and the inside of the tire tread due to lateral forces. This diminishes vehicle control. This is one of the reasons the U.S. Army Run-Flat system limits the speed of its vehicles to 30 m.p.h. in run-flat operation.

My run-flat tire requires no lubricant/coolant and has no lateral slippage. The improved control permits much higher run-flat driving speed. However, with nine separate inserts, it gives a bumpy ride, like a nine-sided wheel.

The drawing in FIG. 5 is based on the smallest 13 inch rim tire available: P-155/80/R-13. FIG. 5 represents a vehicle wheel with a run-flat tire in run-flat operation. 30c represents the tire tread, 30c-x represents the tread footprint with the tire in normal driving at normal air pressure. 30c-y represents the tread footprint at the lowest run-flat operating level. Note that at this lowest operating level the vehicle is supported by two inserts, as the load is transferred from the aft insert to the adjacent forward insert. 30c-z shows only a small shaded segment of the tire tread which represents the tire footprint at the highest run-flat operating level. At this phase, the vehicle is held up by one insert, represented by the dashed outline of the insert. The variation between this maximum and minimum lift (represented by the double arrow) determines the bumpiness of the ride.

For the example shown in FIG. 5, the variation left is about 0.375 inch or about 1 cm. This would be equivalent to riding over an obstruction of that height with distance between the obstruction equal to the effective distance between adjacent rim pads. It would be something like riding over a cobblestone street, or "washboard" road.

The resilience of the tire tread and the shock absorption of the rubber foot pads and rim pads further reduce the bumpiness of the ride. Up to a point, a wider radial width across the two components of the rim pad (34a and 34b) will reduce the bumpiness of the ride. For this size tire, the 3 inch wide rim pad appears to be optimum.

Figure 6:
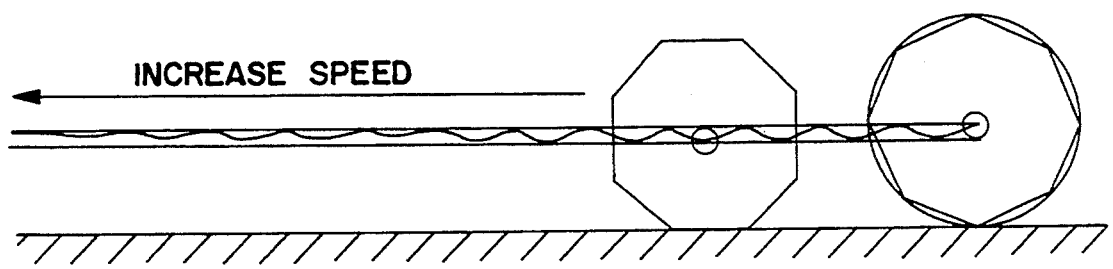
FIG. 6 is a representation to show the rolling characteristics of this run-flat tire, as the wheel turns with increasing speed.

For my run-flat tire, being able to go faster on the highway during run-flat driving can also reduce bumpiness. To illustrate: FIG. 6 represents an eight-sided wheel cut out of a circle, forming eight chords. The depth of each chord is equivalent to the height of equally spaced obstacles on the road. Test runs have been carried out by automobile engineers in England over bumpy roads with high pressure tires (65 p.s.i.) at various speeds. According to those tests: "Amplitude of vibration varies inversely as the square of the tyre velocity." (Source: *Automobile Chassis Design* by R. Dean-Averns, page 31; London: Illiff & Sons, Ltd.)

Looking at FIG. 6, the wavy line represents the path of the wheel axle as the eight-sided wheel moves down the road at an increasing speed. The decreasing amplitude of the curve represents the smoothing out of the ride as speed increases. Apparently, at low speed, the wheel axle would go up and down equal to the depth of the chord, or what would be the equivalent height of the road obstacle. But as speed increases, momentum would keep the wheel, and possibly the sprung weight of the vehicle, from settling down to the lowest level, and smooth out the ride.

In this particular invention, it is very important that the circumferential difference between the rolling circumference of the insert set and the rolling circumference of the tire be at a minimum. Height of inserts are normally measured as a per cent of section height of an inflated tire. Section height is the distance from the tire bead flange to the top of the tread. Section height of the insert is the distance from the tire bead flange to the top of the rim pad. In FIG. 1 the section height of the insert is about 65% of the tire section height. This is substantially higher than is generally acceptable for other types of run-flat tires with internal support.

According to Mr. Tom French, the developer of the run-flat tire for Dunlop Ltd., the height of the load bearing annular internal rim should not exceed 40% of the tire section height. The reason given was that a higher internal support would cause "bottoming" to occur during normal driving from deep potholes or curbs, and would cause failure to the tire structure and inflict damage on the wheel, hub and bearings, etc.

(Source: *Tire Technology* by Tom French, Adam Hilger Bristol, Publisher, Chapter 4, p 87).

If the height of my inserts were limited to 40% of tire section height, my run-flat system would not work very well because the differences between the rolling circumference of the set of inserts and the rolling circumference of the tire would be too great. The greater this distance, the greater the insert must tilt in order to compensate for the differences in rolling circumferences. In my example, as shown in FIGS. 5 and 9, the maximum insert tilt is about 22 degrees. This appeared close to the allowable limit.

My thoughts on Mr. French's run-flat tire are as follows: If occasional "bottoming" will cause that much damage during normal driving, then the system is too fragile for run-flat driving. Also, I think the problem lies elsewhere. Their system with the rigid annular platform rim requires the use of a container of releasable lubricant, and any "bottoming" would prematurely release the lubricant. Apparently, this prerelease causes problems, otherwise there would be no need for the lubricant container. Probably the released lubricant settles on one side of the tire and causes out of balance problems.

In my patent drawing example (Tire size P-155-80-R13) the insert is about 65% of tire section height. In normal driving that leaves only a clearance of about ⅜ of an inch in between the rim pad and the inside of the tire tread, assuming recommended tire pressure is maintained. I am assuming that for the typical driver, on typical urban roads, there may be occasional, or even daily, contact between the rim pad and the inside of the tire tread. But it won't matter. The shock of absorbing rubber rim pads and foot pads, combined with no releasable lubricant means that most of this "bottoming" would be barely noticeable and cause no problems, and not have any significant effect on riding quality in normal driving on reasonably good roads. Also, by selecting the taller inserts, the driver could use this system as a low tire pressure reminder. This is not a recommended way to monitor air pressure, but it would be a big improvement for those millions of drivers who never check their tire pressure.

Different drivers, different type vehicles, different tire dimensions, and different road conditions would be factors in determining the ideal height of the inserts, as well as other characteristics. Desired heights of inserts may vary from 50% to 65% of tire section height. Some trade-offs can be made here. For example, assume a 65% section height insert required nine inserts as shown in FIG. 5. If a driver wanted a 50% section height insert, for whatever reason, it could be done by going from nine inserts to 12 inserts per tire to compensate for the extra circumferential difference between the set of inserts and the tire. This could add about 33% to the weight and cost of the inserts. Also, more inserts would make the run-flat driving smoother.

This run-flat tire will provide the very important features of excellent run-flat speed, control, and distance traveled. Since a run-flat tire would probably never travel more than 0.1% of the total tire miles driven, a slightly bumpy ride should be acceptable.

5. Driving Performance During Normal Inflated Tire Operation

Since about 99.9% of the miles driven on run-flat tires will be driven with all tires fully inflated, it is therefore important that riding quality and performance not be degraded to achieve run-flat capability. The cross-section profile of many run-flat tires is substantially different from that of non-run-flat tires. That is, the tire requires substantial deviation from the optimum cross-section of a conventional tubeless radial tire that is not required to run flat. This is especially true for run-flat tires that use extra thick side-walls instead of internal support. However, many run-flat tires that use internal support must also be modified, including several that I have cited in my prior art section. Some also require thicker sidewalls; others have appendages built into the inside of the tire tread or sidewalls. This forced deviation from the optimum adversely affects driving quality, tire life, and gas consumption.

Other than an occasional benign "bottoming" of a shock absorbing insert on a bad road, the driving quality of my run-flat tire on inflated tires will be about the same as conventional non-run-flat tires. The cross-section profile of the part of the tire that flexes during driving is identical to a regular tire. The insert foot pads are anchored at the tire bead flanges which do not flex during driving.

The overall vehicle weight is reduced when you subtract the weight of the spare tire, wheel, jack and lug wrench—assuming a standard tire is used as a spare. The added unsprung weight of the vehicle due to the weight of the inserts is too small to affect driving quality. However, increased spinning weight due to the added centrifugal force of the inserts, with the center of mass near the middle of the tire section, would have some small effect. It would take slightly more energy to accelerate and to brake. In stop and go city driving, it would require a small increase in gas consumption, but probably less than driving on under-inflated tires.

METHOD OF MAKING THE PREFERRED EMBODIMENT OF INVENTION

Unless this invention can be produced in volume at reasonable cost it will not be useful, and would have little or no commercial value. I believe some description of the method of production of my invention is necessary to fully understand some of the features of this invention. Also, I want to be sure that I comply with the criteria of (a) "Full disclosure," and (b) "Those skilled in the arts" can make it.

Concerning "Full Disclosure": At every stage in the development of this run-flat tire, I tried to determine how it could be made, and if it could be made at a reasonable cost. This process of inventing, which took a long time, was a contributing factor in the evolution of the invention, and caused the abandonment of several embodiments and false starts in writing the patent application. In this approach to this invention, I have devised a method for producing it, and I therefore feel obligated to disclose this method.

Concerning "Those skilled in the arts," it is not at all clear to me that those skilled in the arts can produce this run-flat tire at a reasonable cost. Making the inserts is not the problem. Making the legs and bonding the rim pads to the top of the leg pair, and bonding the pair of foot pads to the base of the leg pair would be routine for those skilled in the art of developing production processes for this and similar rubber-to-metal bonded parts. However, a reasonable cost method for inserting the inserts in the tire and bonding the foot pads to the inside of the tire bead flanges is not so obvious. The best analogy on the product-process relationship that I can think of is the invention of barbed wire. The critical part of that invention was not just the twisting of two strands of wire together and placing a barb every few inches; the key problem was the development of a method that could mass produce the barbed wire at a reasonable cost.

In my patent search on run-flat tires with internal support, I came across an interesting patent that combined both product and method. An understanding of that product and method appeared necessary to fully understand the invention (U.S. Pat. No. 5,115,852 by John Z. Delorean, the developer of the ill-fated "Delorean" Gull Wing Sports cars).

A major goal of this production method for my invention is to create a process that is compatible with existing production methods of tubeless pneumatic tires. Any method of producing this run-flat tire that would require major modification or scrapping of existing tire building machinery or tire mold-curing processes would meet resistance to their introduction, and substantially increase the cost of the run-flat tire due to massive extra capital cost. Therefore, rather than trying to integrate the production of a tire with the inserst, I have chosen an add-on process that should reduce risk, reduce capital requirement, and provide for more flexibility for subsequent changes.

The method described here for automating the insertion of a set of inserts in the tire assumes the input of a conventional tubeless pneumatic tire, and inputs of finished inserts (leg pair bonded to a cured rubber rim pad and to a cured pair of rubber foot pads).

The major components for this insertion process are:
1. A multiple number of Inserter Machines 2. A Stop and Go turntable
3. Components that surround the turntable that carry out six functional stages for the insertion process.

A multiple number of the inserter machines are placed and equally spaced in a circle on the turntable, with a tire being placed horizontally in the center of each inserter machine. For illustration purposes, assume nine inserts are placed inside each tire. Each inserter machine consists of:

(a) Nine push-pull actuator cylinders.
(b) A spoke-like structured support base of nine spokes—one for anchoring each actuator cylinder.
(c) Inserter unit which consists of: an inserter base; inserter neck; and an inserter head.
(d) Adjustable height open center tire table.
(e) Inside diameter tire bead stabilizer unit with nine stabilizer posts.
(f) Appropriate control valves and pump (oil or air).

The nine push-pull actuator cylinders (a) are anchored in a circle on the spoke-like support structure (b), with the rod end of each cylinder pointing inward to the center hub of the inserter machine. Attached to each cylinder rod end is an Inserter Base (c-1) which is attached to an Inserter Neck (c-2), which is attached to an Inserter Head (c-3) which are the three components of the inserter unit.

Each inserter base is designed to slide in and out on a track that would be the inside part of each structural support spoke for each of the nine actuator cylinders. The inserter neck extends up inside the tire with the inserter head attached to the top end of the neck. The inserter base and the co-acting track is designed to stabilize and accurately position the insertion of the inserts.

Each inserter head is equipped with a pair of spring-loaded latches capable of latching on to the opposed pair of legs of each insert. The spring-loaded latch has a mechanism for releasing the latch to release the inserts. All actuator cylinder rod ends are designed to move in and out simultaneously. An adjustable height, round tire table (d), with a large hole in the center of the table, is placed directly above the set of actuator cylinders (a) and centered over the hub of the inserter machine.

The purpose of the Tire Bead Stabilizer unit (e) is to hold the pair of tire bead flanges in the exact, fixed and rigid position necessary for the bonding under pressure of the insert foot pads to the inside of the tire bead flanges.

A description of the Tire Bead Stabilizer Unit is as follows:

Beneath the spoke-like support structure that anchors the actuator cylinders is a flat, circular cam plate, with a large hole in the center with the cam plate centered around the hub of the inserter machine. The cam plate has nine separate spiral cam slots, for the nine separate cam followers which are attached to the nine vertical tire bead holder posts that pass up through the hole in the center of said cam plate, and extend up inside the tire. A separate two-way actuator cylinder rod end is attached to the edge of the cam plate to rotate the cam plate clockwise and counterclockwise to move the tire bead holder post in and out in unison, as needed.

Attached to each of the nine tire bead holder posts is a pair of adjustable forks that can slide in and out and set for the various pairs of tire bead widths for the different tire rim width. When the tire bead holder posts are extended outward, in unison, to contact the tire bead flanges, the adjustable fork on the tire bead holder post immobilizes the pair of tire bead flanges so they cannot move in or out, or move off center. The nine tire bead holder posts are placed radially, directly between the nine inserter heads and necks that are operated by the actuator cylinders.

Within the above production procedure for bonding the inserts to the tire bead flanges, I am providing three choices:

Choice No. 1

Using cured foot pad rubber to cured tire bead flange rubber bonding with the use of an appropriate adhesive. A method for adhesive application must be provided for this choice. This choice uses a finished tubeless pneumatic tire.

Choice No. 2

Using uncured rubber spots on the inside surface of the tire bead flanges that is mated to the uncured surface of the foot pad base. This bonding will require heat and pressure, but no added adhesive. This choice requires some modification in the tire-mold curing stage of the tubeless pneumatic tire, and some modification of the curing of the foot pads of the inserts.

One method for providing for a thin layer of uncured spots in the tire bead flanges is to modify the tire mold rubber diaphragm by circulating a coolant in a modified diaphragm at the specific spot required. Similar circulating coolant channels can be placed in the bottom of the molds for the foot pads to provide a thin layer of uncured rubber at the base of the foot pad.

Choice No. 3

Cured foot pad rubber to cured tire bead flange rubber that has a thin layer of appropriately formulated uncured rubber called cushion gum, which is stuck to the base of the cured rubber foot pads, whereby bonding takes place under heat and pressure without the aid of additional adhesives. This choice only uses a finished or unmodified tubeless pneumatic tire.

Operation of the Insertion Process

For purpose of illustration, assume the use of a turntable with 18 inserter machines, as previously described, that is placed and equally spaced on the turntable. The turntable stops and starts 18 times per revolution.

Assume: Dwell time for stops - 9 seconds
Time between stops - 3 seconds
Time per revolution of turntable - 12 sec×18=216 sec or 3.6 mins It takes six functional stages and one turntable revolution with 18 stops to carry out the complete insertion and bonding process.

The six functional stages are as follows:

Stage I

Feed in inserts to inserter machine by appropriate means (requires 1 stop).

Special Note

For this stage the appropriate means are not obvious. Therefore, I will describe a method for inserting the inserts in the inserter machine in sufficient detail so that those "skilled in the arts" can provide an adequate means for carrying out this function.

Details for Stage I

The major components for Stage I are as follows:
1. Insert feed-in chute to a corral which is a holding bin for a set of inserts.
2. Nine stall corrals for nine inserts
   a. Corral hold-back gate
   b. Trap door at bottom of corral
3. Insert magazine 4. Nine separate insert chutes from corral to insert magazine
5. Elevator for insert magazine.

The key component of Stage I is the insert magazine. This is a fixture for precisely holding nine inserts in the exact position that these inserts would be held when placed inside the tire, lying on its side. This magazine is torodial shaped, like a tire, but with the top side wall open so inserts can be dropped in via the insert chutes. The magazine is supported in place directly over the inserter machine at Stage I by the inserter elevator. The magazine is held at sufficient height so the advancing inserter machine on the turntable can pass beneath the magazine.

The process starts with the flow of the inserts into the corral via the gravity feed-in chute. The corral is a straight in-line container holding nine inserts in a row. Each insert flows in the corral on its side with the rim pads on one side of the corral and the leg pairs on the other side. With the corral full, the hold-back gate closes, and the trap door opens, and simultaneously drops the nine inserts down separate chutes. Each chute takes a separate path so that the chutes exit in a circle directly above the magazine, while the magazine is directly above the inserter machine. The inserts are dropped in the appropriate slots inside the perimeter of the magazine, with the rim pad against the perimeter of the magazine with one leg facing up and the other leg down, pointing toward the center of the magazine.

At the beginning of the Dwell Phase of the turntable, the magazine, which is loaded with a set of nine inserts directly above the tire, is lowered on the tire table of the inserter machine by the inserter elevator in the exact location that the tire will be placed at the next stage. The tire bead flange posts are extended outward to engage the inside lip of the magazine to hold the magazine in the exact center of the inserter machine. The magazine is preset on the elevator so that the set of inserts will be in radial alignment with the inserter heads of the inserter machine. The inserter heads are then extended outward so the spring-loaded latches on the inserter head will engage the latch receiver slots on the upper part of the pair of legs to latch on to the inserts. The inserter heads are then retracted to extract the inserts from the magazine and pull them to the center of the inserter machine. While this extraction of the inserts is going on during the Dwell Phase, the corral is being reloaded. The corral trapdoor is closed, the corral holdback door is opened, and nine more inserts flow into the nine stall corral.

After the inserts have been extracted from the magazine, the magazine elevator raises the magazine above the inserter machine, and the turntable advances to the next stop for Stage II where a tire is dropped on the tire table.

Stage II

Feed in tire to loaded inserter machine by appropriate means. Those skilled in the arts can easily do this stage (requires 1 stop).

Stage III

Preparation for bonding of foot pads to the inside of the tire bead flanges by appropriate means. The appropriate means would depend on which of the three choices is selected for bonding of the foot pads to the inside of the tire bead flange that was previously discussed.

Choice No. 1

For cured rubber to cured rubber bonding process—this would be for adhesive application. One method would be to spray the appropriate adhesive to the base of the foot pads.

Choice No. 2

For the uncured rubber to uncured rubber bonding process—this requires that the tire be rotated to the necessary radial position to line up the uncured rubber spots inside the tire bead flanges to match up with the uncured base of the foot pads. Appropriate tire rotating devices combined with electrical sensors and markers on the tire may be used for this purpose.

Choice No. 3

This uses the layer of thin cured rubber cushion Mum between cured foot pads and inside tire bead flanges. For this choice, Stage III can be eliminated, as it would require no tire rotation and no adhesive application. Only heat and pressure are needed, which follows in Stage IV.

Stage IV

Inserting inserts inside tire (requires 1 stop)

(a) The set of nine inserts that are latched to the set of inserter heads are extended outward, simultaneously, to place the set of actuator cylinders. In this process, the set of spread-apart legs with foot pads may push the pair of tire bead flanges slightly apart, and at the same time the pair of spread-apart legs may also be slightly squeezed inward by the pair of tire bead flanges to get inside the tire.

(b) After the inserts are precisely positioned inside the tire, the set of nine stabilizer posts are extended outward, simultaneously, to push against the pair of tire bead flanges so that the pair of forks, on each of the tire bead stabilizer posts, lock the pair of tire bead flanges in place, so that the distance between the pair of tire bead flanges is the same as if the tire were mounted on the vehicle wheel.

(c) The actuator cylinder control is reversed, pulling the inserts back inward until the base of the foot pads contacts the appropriate spot inside the tire bead flanges and held in contact under a predetermined pressure for the curing stage.

Stage V

Curing and bonding stage (13 stops)

Note

The number of stops and the number of inserter machines on the turntable is a function of the required curing time. One method involves the use of a stationary curing tunnel that encloses the 13 stops when the curing or bonding takes place. There are many curing-bonding options available. It may be a spot-cure microwave curing method or some other appropriate curing method. Those skilled in the art can devise a proper method.

Stage VI

Ejection of run-flat tire from the inserter machine on turntable by appropriate means (1 stop). This stage includes the following steps:

(a) Bonding pressure on foot pads is released.
(b) Insert latch to insert leg is unlatched.
(c) Inserter heads are retracted inward from the tire to the center of inserter machine.
(d) Run-flat tire is removed from tire table of inserter machine and from turntable by appropriate means.

Note

Pressure may not be needed for the entire cure cycle. If so, the number of inserter machines may be reduced and final curing may be carried out by applying heat without pressure after the tire is ejected from the inserter machine and turntable.

On the basis of the foregoing disclosure, those skilled in the appropriate arts should be able to make the necessary components for commercial production of this run-flat tire, and carry out this method for inserting and bonding the inserts to the inside of the tire bead flanges.

Alternate Method for Large Scale Manufacture

Over the long run, if there is large scale demand, it may be both technically and economically feasible to integrate the insertion and bonding of the inserts with the mold/curing stage of tire manufacture. The previously described turntable system could be used in modified form so the green or uncured tire carcasses would be filled in at Stage II on the turntable instead of the cured tire. Appropriately modified curing tire molds would be installed on the turntable, with each inserter machine integrated with each curing mold. Both the inserter machine and the curing mold would be modified to be under curing mold pressure. This would require the use of an appropriately modified bladderless curing mold.

DESCRIPTION OF ALTERNATE EMBODIMENTS

FIGS. 14a to 14g (Alternate #1) shows an insert that is detachable from the tire. A mechanical latch is built into the leg base (Part 46 of FIG. 14a). A latch receiver 44, is bonded to the top of a rubber foot pad 42, which in turn is bonded to the inside of the tire bead flange.

FIGS. 15a to 15e (Alternate #2). The entire run-flat capability is built into a detachable insert, and is used with an unmodified tire. Each insert has a rubber foot pad 48, bonded to the base of each leg, as in the preferred embodiment. But the base of each foot pad is bonded to a thin, feather edged, flat spring 50 (preferably of spring steel). This flat spring has a cross section profile similar to the tire bead flange profile, and is designed so that each insert can be pushed up inside the tire so that the pair of spring clips will latch on to the pair of tire bead flanges. After the set of inserts are snapped in place on the tire, a rubber adhesive tape 52 is applied to the outside of each tire bead flange in a complete circle, which also covers the outside of the spring clips. This rubber adhesive tape acts as a seal to prevent air leakage between the spring clip and the tire bead flange.

FIG. 16 (Alternate #3). The top of the metal leg pair 54 of FIG. 16 is modified and joined by a hinge bolt 56 to serve as the rim pad. Rubber pads may or may not be bonded to the top of the leg pair.

FIG. 17 (Alternate #4). A separate metal rim pad 58 is joined to the top of the leg pair 60 by a hinge bolt 62. Rubber pads may or may not be bonded to this separate metal rim pad.

Figure 19:
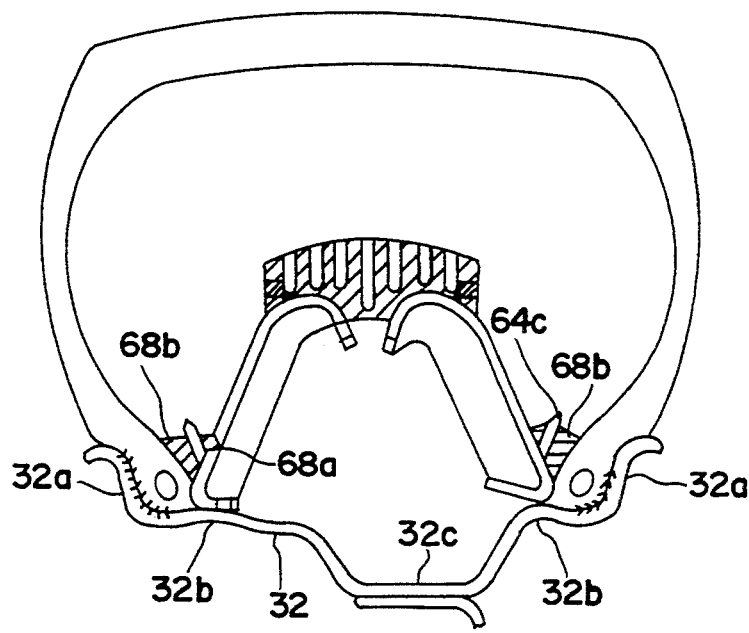
Figure 20:
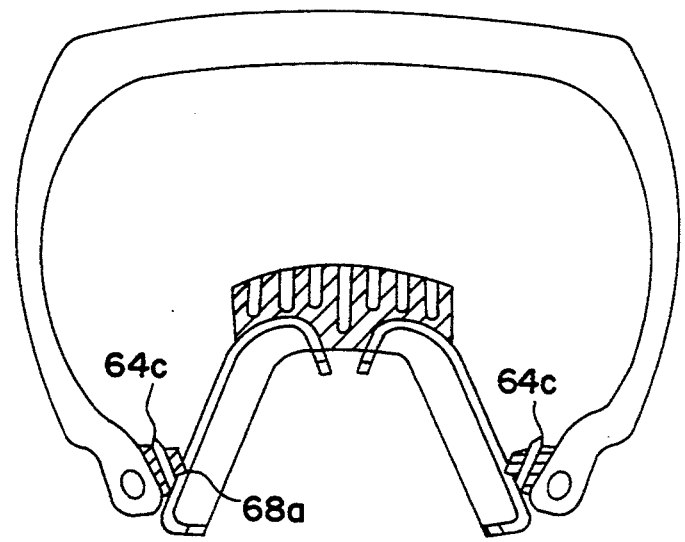

FIGS. 18, 19 and 20 (Alternate #5) show another type of detachable insert. FIG. 18 shows how this run-flat tire operates under load, as the wheel turns. FIG. 19 shows a sectional side view of one insert as mounted on the wheel. FIG. 20 shows the same view as FIG. 19 before the tire is mounted on the wheel.

In run-flat operation, as shown in FIG. 18, each insert is sequentially tilted, stretching the cable rubber spring 68 on one side and relaxing it on the other side. The insert snaps back into the upright position when load is removed. Mated gear teeth 64a and 66a on the wheel rim on the base of the insert legs prevent slippage of the legs. In run-flat operation, part of the load that passes down through the legs is transmitted outward through the tire bead flange 30b against the wheel rim flanges 32a. The remainder of the load is transmitted down directly through the gear teeth at the leg base 64a to the co-acting gear teeth on the wheel rim 66a.

This embodiment differs from the preferred embodiment in that the rubber foot pads are replaced with a type of cable-to-rubber shear spring 68. A pair of smaller extra cable rings 68a are encased in a ring of rubber 68b and bonded to the inside of the tire bead flanges. This could be done during the process of building, molding and curing the tire. After the tire comes out of the mold, the cable is cut into equal length segments by appropriate means, in order to create one pair of cable-to-rubber shear springs for each insert. FIG. 18 shows a side view of some of these cable-to-rubber shear springs, and FIG. 19 and FIG. 20 show end views.

Each leg base has a built in hook 64c. Each insert can be pushed up inside the tire, penetrate the rubber ring 68b surrounding the cable segment 68a, and lock on to the center of the cable segment. The inserter machine as described in "Method of Making the Preferred Embodiment" can be used to insert the inserts for this embodiment, or some other appropriate method.

Note that in FIG. 20 the bottom of the pair of legs protrude inward inside the plane of the tire bead flanges. In mounting this tire on the wheel 32, the pair of tire bead flanges are first put in the trench or drop center of the wheel 32c, as is done on a conventional non-run-flat tire. But for this run-flat tire, as the applied air pressure pushes the tire bead flanges outward, up the incline plane of the drop center trench 32c, the bottom of the legs are pushed upward and held upward as the tire bead flange pops over the safety ridge 32b of the wheel 32. This upward push of the legs pre-load the cable-to-rubber shear spring to hold the inserts in the upright position inside of the tire.

CONCLUSION

This is the first run-flat tire invention that provides all the necessary criteria for widespread commercial success, These criteria include:
(1) A cost low enough so as not to be a barrier to commercial use,
(2) A tire that the run-flat capabilities would not significantly reduce normal driving performance or tire life.
(3) A run-flat tire that, during run-flat driving, can be driven an adequate distance, at adequate speed, and in adequate comfort,
(4) A run-flat tire that can be repaired as quickly and as easily and at about the same cost of non-run flat tires.
(5) A run-flat tire that can compete in the replacement tire market by being able to fit on conventional wheels to replace conventional non-run flat tires.
(6) A run-flat tire that could reduce overall vehicle weight, after subtracting the weight of a conventional spare tire, wheel jack and lug wrench, which would no longer be needed, and also free-up extra storage space.

This run-flat tire can make the spare tire obsolete.

The foregoing disclosure has concentrated on one particular embodiment of this invention and one particular method of inserting and bonding the inserts to the inside of the tire bead flanges. It is obvious that there are many variations in attaching the top of each leg pair to each other and to the rim pad that would permit the legs to swing in and out. There are also many variations in the type and methods of anchoring the pair of leg bases to the inside of the tire bead flanges that would permit fore and aft tilting. Those skilled in the arts can make additional embodiments and modifications without departing from the spirit of this invention. Accordingly, it is to be understood that the descriptions and illustrations are provided to facilitate comprehension of the invention and should not be taken to limit its scope.

What is claimed is:

IN THE CLAIMS:

1. A run-flat tire having internal supports and for mounting on a drop-center wheel, comprising:
   a plurality of separate, free-standing, load supporting inserts that are equally spaced in a circle inside a pneumatic tubeless tire, wherein:
   each of said inserts comprises a rim pad and a pair of substantially rigid legs having tops and bases, said tops of each said leg is anchored close together to said rim pad in a manner that permits each of said legs of said pair of legs to independently swing in and out, when necessary;
   said bases of said legs of said leg pair of each insert are spread apart and anchored across an opposite pair of tire bead flanges to hold each insert in the upright position so that said rim pads extend up inside the tire towards the tire tread; and wherein:
   in run-flat operation, under vehicle load, said anchor of said bases of said legs of said leg pair to said opposite pair of tire bead flanges will permit the inserts, when under load, to deflect circumferentially fore and aft as needed, and when said load is removed, each insert will return to its upright position; and
   under vehicle load, the spread apart legs of each insert will push said tire bead flange outward against wheel rim flanges of said wheel to aid in keeping the tire on said wheel, and at the same time provide a stabilizing base against lateral forces for each of said inserts.

2. The run-flat tire of claim 1, wherein said rim pad is an elastic, shock absorbing rubber rim pad, the tops of each of said pair of insert legs serves as a support base for said rubber rim pad, said rubber pad is bonded to said top part of said leg pair to join the top of the leg pair together while bonding the rubber rim pad to the leg in a manner that permits said leg pair to swing in and out, when required, by bending said rubber rim pad at its middle.

3. The run-flat of claim 2 wherein each rim pad comprises two rubber rim pads bonded across the pair of legs, thereby leaving a gap between said two pads.

4. The run-flat tire of claim 1, wherein said anchor is an elastic, shock absorbing rubber foot pad; said foot pad is placed between said leg base and said tire bead flange, and the top of said foot pad is bonded to the base of said leg, and the bottom of said foot pad is bonded to the inside of said tire bead flange.

5. A run-flat tire that uses internal support comprising:
   (a) a tubeless, pneumatic tire having an opposed pair of tire bead flanges;
   (b) a one piece, drop center wheel having wheel rim flanges;
   (c) a plurality of separate, free standing, load supporting inserts that are placed in, and equally spaced around, a circle inside said tire; whereby:
   each insert consists of a pair of substantially rigid legs and a rim pad;
   tops of each leg of said pair of legs are attached close together to said rim pad such that said leg pair can swing in and out when necessary;
   a base of said leg pair of each insert is spread apart and anchored across said opposed pair of tire bead flanges such that each pair of inserts are held straight outward so that the top of said rim pads face the inside of the tire tread;
   (d) whereby, in run-flat operation, under vehicle load, pressure against said rim pad is transmitted downward and outward through the spread apart legs to push outward said tire bead flanges against said wheel rim flanges of said wheel to aid in keeping the tire on the wheel;
   (e) whereby said leg bases are anchored to said tire bead flanges so that each insert under vehicle load may deflect circumferentially fore and aft, as needed, and spring back to an upright position when said vehicle load is removed; and
   (f) whereby said closely spaced leg top and spread leg base provide a triangular-shaped support structure that provides a stabilizing base for said rim pad against lateral forces in run-flat operation.

6. The run-flat tire of claim 5, wherein:
   said rim pad is at least one elastic, shock absorbing rubber pad;
   the top of each of said pair of legs of said insert serves as a support base for said rubber rim pad;
   said rubber rim pad is bonded to said top part of said leg pair to join the top of the leg pair together while bonding the rubber rim pad to the leg in a manner that permits said leg pair to swing in and out, when required, by bending said rubber rim pad in the middle.

7. The run-flat tire of claim 6 wherein said at least one rubber rim pad comprises two rubber rim pads bonded across the pair of legs with a gap between said two pads of each insert.

8. The run-flat tire of claim 5 whereby radial slippage between said tire bead flange and said wheel rim flange during run-flat operation, is reduced by the use of an adhesive applied to a contact area between said tire bead flanges and said wheel rim flanges prior to mounting the tire on said wheel rim flanges and the wheel, said adhesive having a low peel strength and a high shear strength.

9. The run-flat tire of claim 5 whereby said anchor comprises an elastic, rubber foot pad; wherein said foot pad is placed between said leg base and said tire bead flange, a top of said foot pad is bonded to the base of said leg, and the bottom of said foot pad is bonded to the inside of said tire bead flange.

10. The run-flat tire of claim 5 wherein the top ends of said substantially rigid leg pairs are hinged to each other and to a substantially rigid rim pad by a single hinge pin that allows said pair of legs to swing in and out, as needed.

* * * * *